US005933181A

United States Patent [19]

Shimizu et al.

[11] Patent Number: 5,933,181

[45] Date of Patent: *Aug. 3, 1999

[54] PHOTOGRAPHIC RECORDING APPARATUS

[75] Inventors: Yukihiko Shimizu; Kinya Ueda, both of Mobara; Yoshijiro Ushio, Tokyo; Masahiro Furuta, Tokyo; Takehiko Ueda, Tokyo, all of Japan

[73] Assignees: Futaba Denshi Kogyo K.K., Mobara; Nikon Corporation, Tokyo, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,845

[22] Filed: Mar. 29, 1996

[51] Int. Cl.[6] .................... B41J 2/47; B41J 2/435

[52] U.S. Cl. .................... 347/232; 347/237

[58] Field of Search .................... 347/237, 232, 347/244, 118; 399/4

[56] References Cited

U.S. PATENT DOCUMENTS 3,967,893 7/1976 Majewicz .................... 355/4
4,131,782 12/1978 Einstein et al. .................... 219/121
4,737,748 4/1988 Ito .................... 355/70
4,980,701 12/1990 Contois et al. .................... 347/237
4,998,118 3/1991 Ng .................... 347/236
5,084,714 1/1992 Beaman et al. .................... 347/244
5,187,521 2/1993 Shimizu et al. .................... 347/118
5,563,647 10/1996 Fisli .................... 347/232

*Primary Examiner*—N. Le
*Assistant Examiner*—Thinh Nguyen
*Attorney, Agent, or Firm*—Oblon, Spivak, McClelland, Maier & Neustadt, P.C.

[57] ABSTRACT

A photographic recording apparatus capable of being small-sized and simplified in structure and reducing color aberration of an optical system. A refractive index distribution type lens array has a central axis arranged perpendicularly to a light emission direction of a fluorescent luminous tube. Light emitted from the fluorescent luminous tube passes through red (R), green (G) and blue (B) color filters, is incident on the lens array, is reflected on a first mirror and then is guided to a color film, resulting in forming an image on the color film. The fluorescent luminous tube is driven depending on data on R, G and B colors and the whole apparatus is moved with respect to the color film. The color filters are changed over and scan of the color film is carried out three times, so that an image of R, G and B colors may be formed on the color film.

4 Claims, 6 Drawing Sheets

PHOTOGRAPHIC RECORDING APPARATUS

BACKGROUND OF THE INVENTION

This invention relates to a photographic recording apparatus for carrying out photo-recording on a photo-recording medium. For example, the present invention may be suitably applied to a color printer or the like which is adapted to form an image on a recording medium such as an instant or convenience film for photo-coloring or the like.

A color printer for irradiating light to a photosensitive material such as an instant color film or the like to write an image on the photosensitive material generally utilizes a refractive index distribution type lens array in order to simplify an optical system and reduce a manufacturing cost of the printer. The refractive index distribution type lens array is formed into a substantially cylindrical shape and has a refractive index distribution wherein a refractive index is decreased in a manner like a parabolic curve from a central axis thereof to an outer periphery thereof. Light incident on the refractive index distribution type lens travels in the lens while meandering at a predetermined cycle. The refractive index distribution type lens array is an optical element formed by precisely integratedly arraying a number of refractive index distribution type lenses while keeping central axes thereof parallel to each other and then securely arranging the thus-arrayed lenses between a plurality of flame plates. The optical system of the conventional color printer is so constructed that the refractive index distribution type lens array is arranged in proximity to a luminous surface of a luminous element in order to render a central axis of the refractive index distribution type lens array parallel to a light emission direction of the luminous element. The luminous element emits dot-like light for forming an image. The thus-emitted light is incident directly on the refractive index distribution type lens array and then discharged from the lens array, resulting in directly forming an erected image of an equi-magnification on an instant or convenience color film.

Unfortunately, such optical arrangement of the luminous element and refractive index distribution type lens array as described above causes a distance between the luminous surface of the luminous element and the image formed on the instant color film or an object-image surface distance (or conjugate length) to be substantially increased to a level as large as about 40 mm, resulting in failing in thinning of the color printer or formation of the color printer into a reduced thickness. A refractive index distribution type lens constructed so as to be decreased in object-image surface distance is commercially available. However, the commercially available lens is substantially increased in optical dispersion in the lens, to thereby readily cause occurrence of chromatic aberration which renders use of the lens as the optical element for the color printer fully impossible.

SUMMARY OF THE INVENTION

The present invention has been made in view of the foregoing disadvantage of the prior art.

Accordingly, it is an object of the present invention to provide a photographic recording apparatus which is capable of being constructed into a compact and down-sized structure.

It is another object of the present invention to provide a photographic recording apparatus which is capable of substantially reducing chromatic aberration.

In accordance with the present invention, a photographic recording apparatus is provided. The photographic recording apparatus includes a luminous element including a number of luminous dots, a refractive index distribution type lens array arranged in proximity to the luminous element in such a manner that a central axis thereof intersects a light emission direction of the luminous element, a first optical means for permitting light emitted from the luminous element to be incident on the refractive index distribution type lens array, and a second optical means for guiding light passing through the refractive index distribution type lens array to a photosensitive recording medium.

In a preferred embodiment of the present invention, color filters of red (R), green (G) and blue (B) colors (hereinafter also referred to as "R, G and B color filters") are arranged between the luminous element and the first optical means.

In a preferred embodiment of the present invention, R, G and B color filters are arranged between the second optical means and the photosensitive recording medium.

In a preferred embodiment of the present invention, R, G and B color filters are arranged between the luminous element and the first optical means and between the second optical means and the photosensitive recording medium.

In the photographic recording apparatus of the present invention constructed as described above, the luminous dots of the luminous element emit dot-like light, of which a light path is varied by the first optical means. The light is then incident on the refractive index distribution type lens array of which the central axis is defined so as to intersect a light emission direction of the luminous element. The light passing through the refractive index distribution type lens array is then guided to the second optical means, wherein a light path of the light is varied again. Thereafter, it is guided to the photosensitive recording medium, resulting in forming an image on the recording medium.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
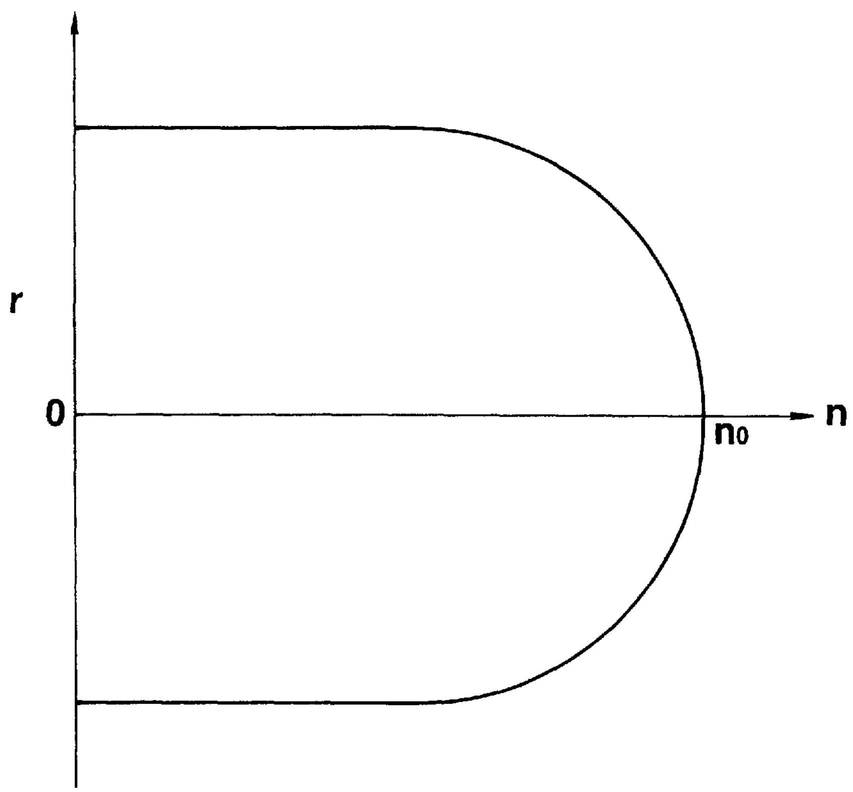
FIG. 1 is a graphical representation showing a distribution of a refractive index in a refractive index distribution type lens used in an embodiment of a graphical recording apparatus according to the present invention.

Now, a photographic recording apparatus according to the present invention will be described hereinafter with reference to the accompanying drawings.

In general, a color film photographic recording apparatus of each of embodiments of a photographic recording apparatus according to the present invention which is generally designated at reference numeral 10 in the accompanying drawings is so constructed that dot-like light emitted from a fluorescent luminous tube is applied through a refractive index distribution type lens array to a color film, resulting in forming an image on the film.

Figure 3:
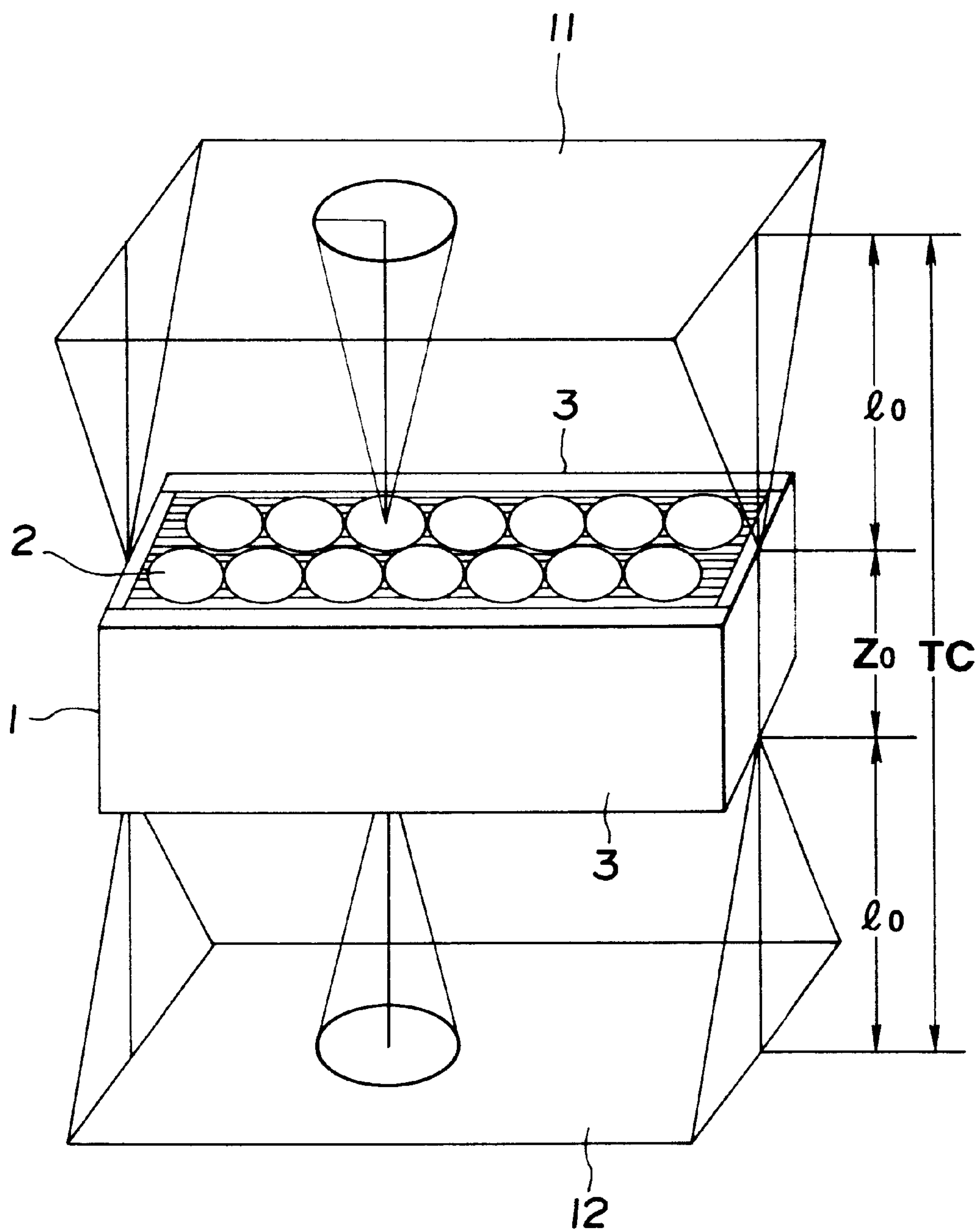
FIG. 3 is a perspective view schematically showing a refractive index distribution type lens array incorporated in an embodiment of a graphical recording apparatus according to the present invention.

First, an optical principle and optical characteristics of a refractive index distribution type lens array and refractive index distribution type lenses used in each of embodiments of the present invention will be described hereinafter. As shown in FIG. 3, a refractive index distribution type lens array 1 used in each of embodiments of the present invention is an optical element formed by precisely integratedly arraying a number of refractive index distribution type lenses 2 while keeping central axes thereof parallel to each other and then fixedly arranging the lenses 2 between a plurality of frame plates 3. The refractive index distribution type lenses (hereinafter merely referred to as "lenses") each have such a parabolic refractive index distribution as shown in FIG. 1. The refractive index distribution is approximately represented by the following expression (1):

$$n = n_0\left(1 - \frac{A}{2}r^2\right) \quad (1)$$

wherein $n_0$ is a refractive index of a lens on a central axis thereof, A is a refractive index distribution constant, and r is a distance from a center of the lens in a radial direction thereof. As indicated by the above-described expression (1) and FIG. 1, a refractive index of the lens on a central axis thereof is represented by $n_0$.

Also, conditions for outgoing of beams incident on a lens of Z in length which has a refractive index distribution represented by the expression (1) described above are given by a light beam matrix represented by the following expression (2), so that a variation in value of Z as required permits lenses different in image formation to be provided:

$$\begin{bmatrix} r_2 \\ r_2 \end{bmatrix} = \begin{bmatrix} \cos(\sqrt{A}\,Z) & \dfrac{\sin(\sqrt{A}\,Z)}{n_0\sqrt{A}} \\ -n_0\sqrt{A}\,\sin(\sqrt{A}\,Z) & \cos(\sqrt{A}\,Z) \end{bmatrix} \begin{bmatrix} r_2 \\ r_2 \end{bmatrix} \quad (2)$$

wherein Z is a length of a lens, $r_1$ is a lens incident angle, $r_2$ is a lens outgoing angle.

Figure 2:
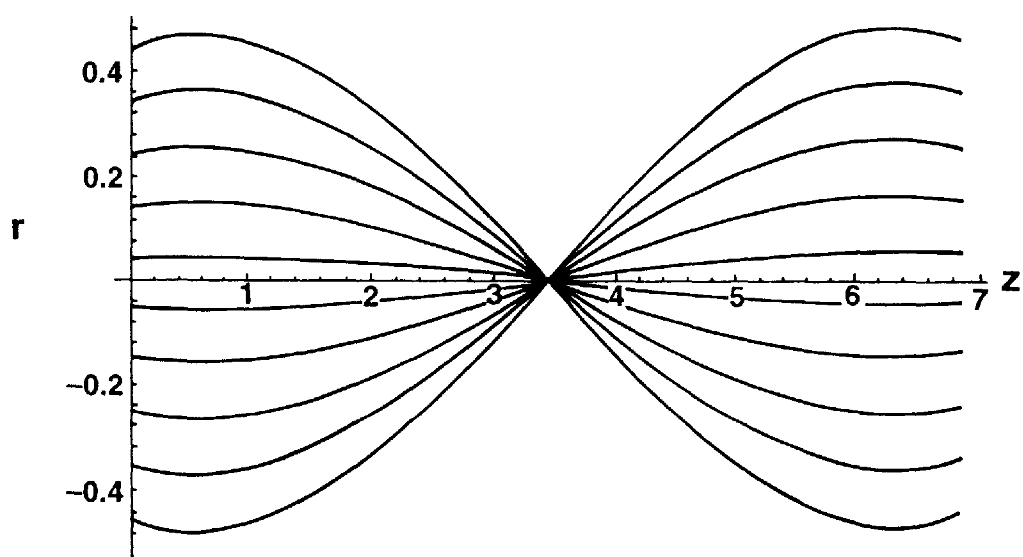
FIG. 2 is a graphical representation showing results of ray tracing in a refractive index distribution type lens used in an embodiment of a graphical recording apparatus according to the present invention.

FIG. 2 shows results of ray tracing in an interior of a lens obtained in the case that Z is a length ($Z_0$) of the lens at the time when an erected image of an equi-magnification is formed.

Also, a distance $l_0$ from one end surface of a lens shown in FIG. 3 to an object surface 11 or a distance $l_0$ from the other end surface of the lens to an image surface 12 (working distance) is represented by the following expression (3):

$$l_0 = -\frac{1}{n_0\sqrt{A}}\tan\left(\frac{Z_0\pi}{P}\right) \quad (3)$$

wherein P is a meandering cycle length, which is represented by the following expression (4):

$$P = 2\pi / \sqrt{A} \quad (4)$$

Also, a conjugate length TC shown in FIG. 3 or an object-image surface distance is represented by the following expression (5):

$$TC = Z_0 + 2I_0 \quad (5)$$

As described above, in the conventional color film photographic recording apparatus, the refractive index distribution type lens array is arranged in proximity to a luminous surface of the luminous element so that a central axis of the refractive index distribution type lens array is rendered parallel to a light emission direction of the luminous element. In order to form the color film photographic recording apparatus into a reduced thickness while establishing the above-described optical positional relationship between the refractive index distribution type lens array and the luminous element, it is required to decrease the conjugate length TC.

As will be noted from the above-described equation (5), a decrease in conjugate length TC requires to reduce the lens length $Z_0$ and/or working distance $I_0$ at the time of formation of an erected image of an equi-magnification. The working distance $I_0$ is a function of a refractive index $n_0$ of a lens on a central axis thereof, a refractive index distribution constant A thereof and a length $Z_0$ thereof at the time of formation of an erected image of an equi-magnification. A variation in value of each of such factors permits the working distance $I_0$ to be reduced. In view of the fact, it would be considered that an increase in each of the refractive index $n_0$ in the central axis and the refractive index distribution constant A leads to a decrease in conjugate length TC.

However, when the conventional color film photographic recording apparatus is so constructed that the working distance $I_0$ of the lens is reduced to reduce the conjugate length TC as described above, light beams passing through the lens are subject to wavelength dispersion, to thereby cause chromatic aberration, leading to a failure in formation of a satisfactory image. Such construction is not accepted because the chromatic aberration thus-generated causes a color film photographic recording apparatus to have a critical drawback. Also, when a color image is to be obtained by means of a luminous element exhibiting luminescence of an increased spectral band width and filters of red, green and blue colors (R, G and B color filters), excessive decrease in working distance of the lens leads to a decrease in interval between the lens and an object surface or interval between the lens and an image surface, to thereby fail to ensure a space required for arranging the R, G and B color filters therein.

Figure 4A:
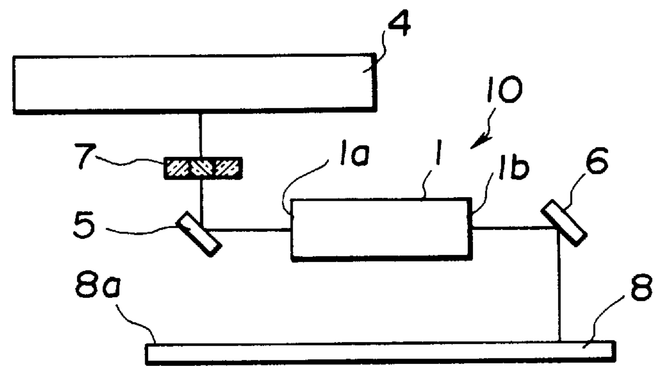
FIGS. 4(*a*) to 4(*c*) each are a schematic view showing a color film graphical recording apparatus which is each of embodiments of a graphical recording apparatus according to the present invention.
Figure 4B:
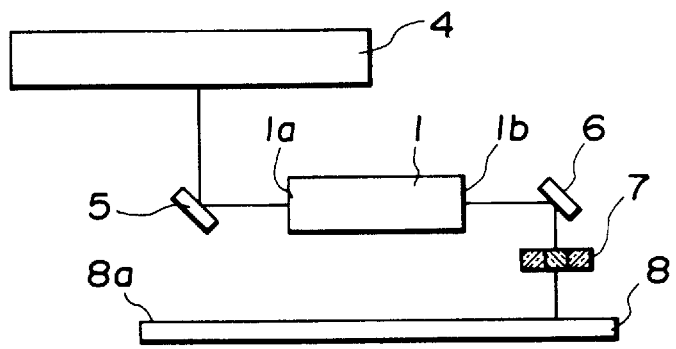
Figure 4C:
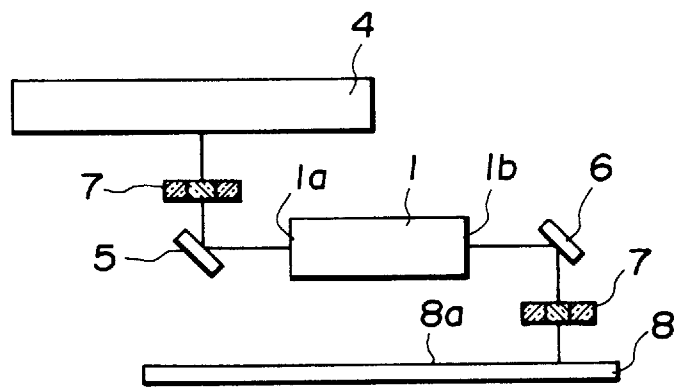

In view of the above, the photographic recording apparatus of the illustrated embodiment in the form of a color film photographic recording apparatus is constructed in such a manner as shown in FIG. 4(*a*). More particularly, a color film photographic recording apparatus generally designated at reference numeral 10 includes a fluorescent luminous tube 4 acting as a luminous element, which includes luminous dot rows in which a number of luminous dots are arranged in predetermined directions. The luminous dots of the fluorescent luminous tube 4 include Zn phosphors having many ingredients of red (R) to blue (B) luminous colors contained therein.

The color film photographic recording apparatus 10 also includes such a refractive index distribution type lens array 1 as described above, which is arranged in proximity to a front surface side of the fluorescent luminous tube 4 irradiated with light emitted from the luminous dots. Refractive index distribution type lenses 2 for the refractive index distribution type lens array 1 each have a conjugate length TC set to be 43.2 mm. The refractive index distribution type lens array 1 is so arranged that a central axis thereof is perpendicular to a light emission direction of the fluorescent luminous tube 4. The apparatus 10 further includes a first mirror 5 arranged between a light-incident-side end surface 1*a* of the refractive index distribution type lens array 1 and a front surface of the fluorescent luminous tube 4 so as to act as a first optical means. The first mirror 5 functions to reflect light emitted from the fluorescent luminous tube 4 at an angle of 90 degrees, to thereby permit it to be incident on the refractive index distribution type lens array 1. Reference numeral 6 designates a second mirror 6 acting as a second optical means, which is arranged in proximity to a light-outgoing-side end surface 1*b* of the refractive index distribution type lens array 1. The second mirror 6 acts to reflect light passing through the refractive index distribution type lens array 1 to guide it in a direction perpendicular to the central axis of the refractive index distribution type lens array 1.

Between the first mirror 5 and the fluorescent luminous tube 4 are R, G and B color filters 7 in a manner to intersect a light path. The R, G and B color filters 7 may be mutually positionally changed over with respect to light emitted from the fluorescent luminous tube 4, so that any suitable selection of the R, G and B color filters 7 depending on colors desired permits any desired luminous image of three primary colors to be provided. The R, G and B color filters 7 each may be made of gelatin into a thickness of 0.1 mm.

As shown in FIG. 4(*a*), a color film 8 is arranged in proximity to the color film photographic recording apparatus 10 so as to act as a photosensitive recording medium. The color film 8 includes a photosensitive surface 8*a* adapted to be kept parallel to the central axis of the refractive index distribution type lens array 1. The color film photographic recording apparatus 10 of the illustrated embodiment is constructed so as to be moved while keeping the central axis of the refractive index distribution type lens array 1 parallel to the color film 8. A so-called self-developing type film manufactured by Polaroid Corp. may be used as the color film 8 for the illustrated embodiment.

Now, the manner of operation of the color film photographic recording apparatus of the illustrated embodiment will be described hereinafter with reference to FIG. 4(*a*).

The fluorescent luminous tube 4 is driven to cause the luminous dots to emit light at predetermined timings and the whole color film photographic recording apparatus 10 is moved or transferred at a constant speed at a timing in synchronism with driving of the fluorescent luminous tube 4. This causes light emitted from the fluorescent luminous tube 4 to pass through the R. G and B color filters 7 and then be reflected on the first mirror 5, resulting in being incident on the refractive index distribution type lens array 1. Then, the light passes through the lens array 1 and then is reflected on the second mirror 6, to thereby form an image on the color film 8.

During the above-described driving, an NTCS signal is transferred to the color film photographic recording apparatus 10, so that processing such as luminance correction or the like is carried out through a correction circuit arranged in the apparatus 10. Depending on R, G and B data thus corrected, the fluorescent luminous tube 4 is driven, resulting in the photosensitive surface 8*a* of the color film 8 being scanned three times. At the same time, the R, G and B color filters 7 are changed over every scanning of the color film 8, so that a desired image of R, G and B colors may be formed on the photosensitive surface 8*a* of the color film 8.

In the color film photographic recording apparatus 10 of the illustrated embodiment, the refractive index distribution type lens array 1 is arranged in a manner to be perpendicular to a light emission direction of the fluorescent luminous tube 4. Such arrangement permits a whole thickness of the color film photographic recording apparatus 10 to be substantially reduced as compared with the prior art, resulting in the apparatus being constructed into a compact and portable structure.

Figure 5:
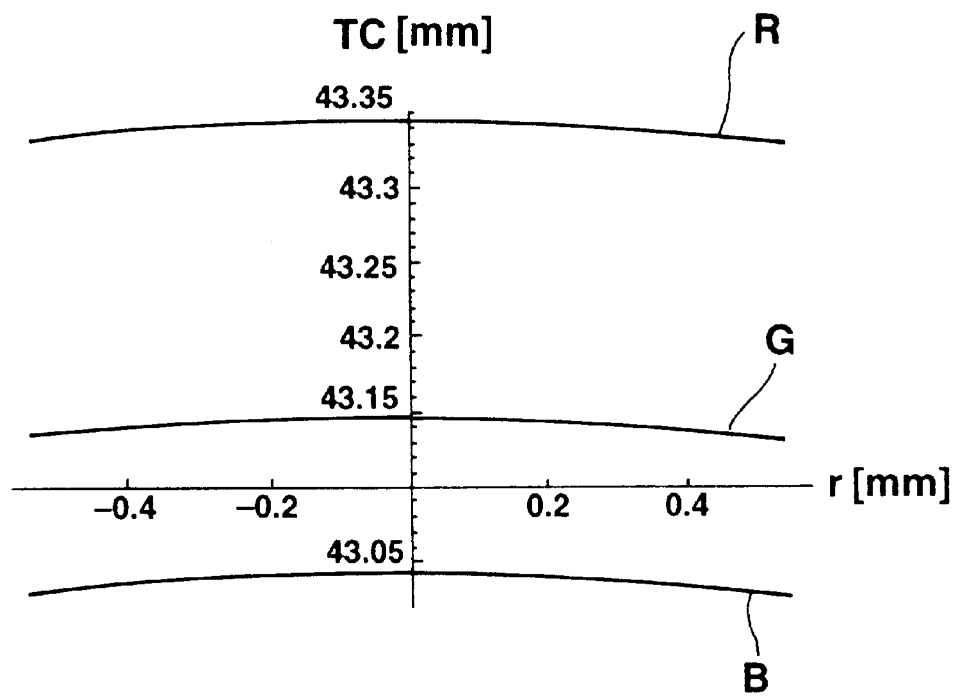
FIG. 5 is a graphical representation showing relationship between a diameter of a lens element of a refractive index distribution type lens array and a conjugate length thereof in an embodiment of the present invention.

Also, such optical arrangement as described above permits the refractive index distribution type lenses used to be increased in working distance, to thereby eliminate a problem on chromatic aberration. FIG. 5 shows a difference in position of image formation with respect to three R, G and B colors in the refractive index distribution type lens array 1 incorporated in the illustrated embodiment, wherein an axis of abscissas indicates a diameter r of the lens array and an axis of ordinates indicates the conjugate length TC and R, G and B indicate red, green and blue, respectively. FIG. 5 indicates that the illustrated embodiment permits image formation to be carried out at substantially the same point with respect to the R, G and B colors.

Figure 6:
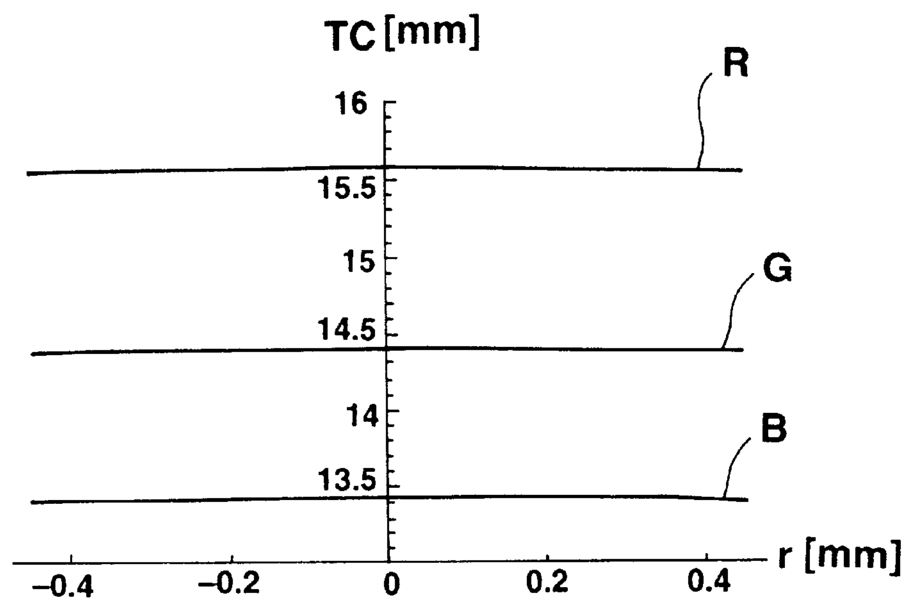
FIG. 6 is a graphical representation showing relationship between a diameter of a lens element of a refractive index distribution type lens array decreased in conjugate length and a conjugate length thereof.

FIG. 6 shows a difference in position of image formation with respect to three R, G and B colors which occurs in a refractive index distribution type lens array decreased in conjugate length (TC: 14.4 mm). As will be noted from comparison between FIGS. 5 and 6, the lens array decreased in conjugate length causes a difference in the position to be as large as up to about 2 mm among the R, G and B colors, leading to an increase in chromatic aberration.

A modulation transfer function (MTF) may be used as one of indexes for indicating resolution of a refractive index distribution type lens array. The MTF is a response function calculated on the basis of a level of light quantity by which a slit scan or a CCD image sensor receives an image of a rectangular wave lattice pattern and given by the following expression (6):

$$MTF(w) = \frac{i(W)\max - i(W)\min}{i(W)\max + i(W)\min} \times 100\,(\%) \tag{6}$$

wherein i(W)max and i(W)min are a maximum vale of a rectangular wave response at a space frequency w(1 p/mm) and a minimum value thereof, respectively. Approach of the MTF to 100% indicates formation of an image faithful to an original picture.

In view of resolution of an eye, a sensor such as a photographic film or the like, a position on a light receiving surface which is capable of providing a clear image has a tolerance, which is called a depth of focus. A depth of focus of a refractive index distribution type lens array is expressed by relationship between the MTF and a deviation Δ1 of a light receiving surface from an image surface in the refractive index distribution type lens array.

Figure 7:
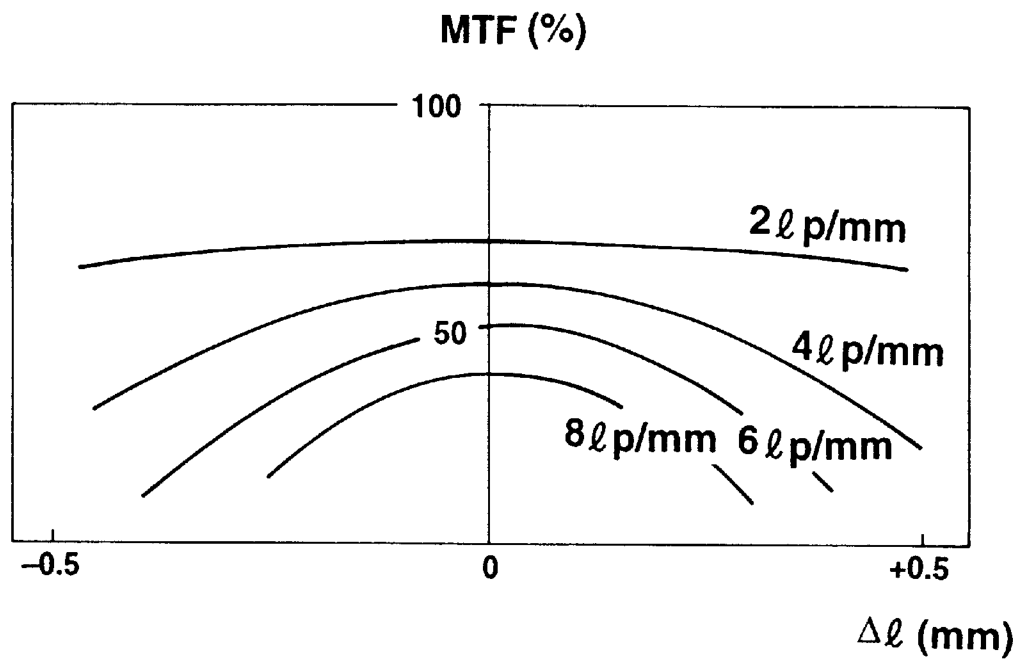
FIG. 7 is a graphical representation showing relationship between a deviation Δ1 of a light receiving surface from an image surface and an MTF in a refractive index distribution type lens array used in an embodiment of the present invention.
Figure 8:
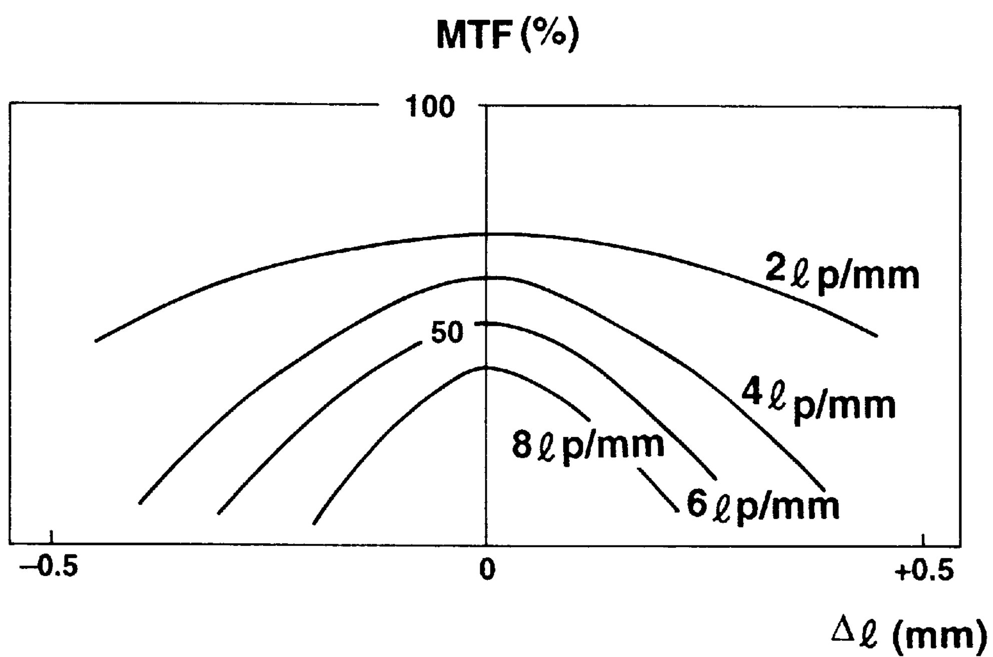
FIG. 8 is a graphical representation showing relationship between a deviation Δ1 of a light receiving surface from an image surface and an MTF in a refractive index distribution type lens array decreased in conjugate length.

FIG. 7 shows relationship between the MTF and a deviation Δ1 of a light receiving surface from an image surface in the refractive index distribution type lens array 1 used in the illustrated embodiment. Also, FIG. 8 shows relationship between the MTF and a deviation Δ1 of a light receiving surface from an image surface in a refractive index distribution type lens array decreased in conjugate length. Comparison between FIGS. 7 and 8 indicates that the refractive index distribution type lens array 1 used in the illustrated embodiment has an increased depth of focus. Thus, it will be noted that the illustrated embodiment accomplishes satisfactory image formation without being adversely affected by deflection on a surface of a color film or the like.

Now, wave aberration in the optical system in the color film photographic recording apparatus of the illustrated embodiment will be considered. Light emitted from a monochromatic light source reaches a position on a spherical surface having a point light source defined as a center thereof in a predetermined period of time in a homogeneous isotropic medium such as a medium having a constant refractive index. Such a spherical surface causes vibration of a light wave to have an equal phase thereon and such a surface is called a wave surface. However, an optical system having aberration fails to permit the wave surface to be a spherical surface. The aberration is caused due to a non-uniform refractive index in a medium, a variation in phase as seen in a lens (or a configuration such as a concave shape) or the like. In general, wave aberration is obtained by multiplying a geometric distance between a point on an ideal spherical wave surface and a point on a wave surface distorted due to aberration by a refractive index.

The refractive index distribution type lens array 1 used in the illustrated embodiment is substantially affected by wave aberration because the lenses for the lens array 1 each have an increased refractive index distribution defined therein as described above. Nevertheless, in the illustrated embodiment, the R, G and B color filters 7 are arranged between the fluorescent luminous tube 4 and the first mirror 5, so that suitable adjustment of an interval between the refractive index distribution type lens array 1 and the R, G and B color filters 7 which is defined in a light advance direction permits wave aberration due to the refractive index distribution type lens array 1 to be canceled.

In the illustrated embodiment, the R, G and B color filters 7 are arranged between the fluorescent luminous tube 4 and the first mirror 5. A second embodiment shown in FIG. 4(*b*) is so constructed that R, G and B color filters 7 are arranged between a second mirror 6 and a color film 8. Such construction permits the second embodiment to exhibit substantially the same function and advantage as the first embodiment. The remaining part of the second embodiment may be constructed in substantially the same manner as the first embodiment described above.

Referring now to FIG. 4(*c*), a third embodiment of a photographic recording apparatus according to the present invention is illustrated which is likewise in the form of a color film photographic recording apparatus. A color film photographic recording apparatus of the third embodiment is constructed in such a manner that R, G and B filter colors 7 and 7 are arranged between a fluorescent luminous tube 4 and a first mirror 5 and between a second mirror 6 and a color film 8, respectively. Such construction permits not only wave aberration due to a refractive index distribution type lens array 1 to be canceled as in the first and second embodiments described above but wave aberration due to the R, G and B color filters 7 to be likewise canceled.

Figure 9A:
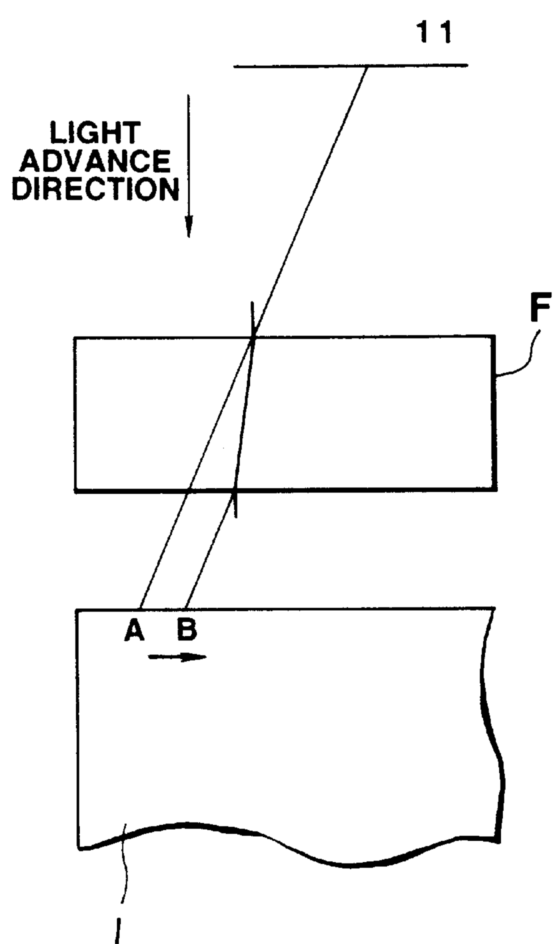
FIGS. 9(*a*) and 9(*b*) each are a schematic view showing a light path equivalent to a light path in each of embodiments of the present invention.
Figure 9B:
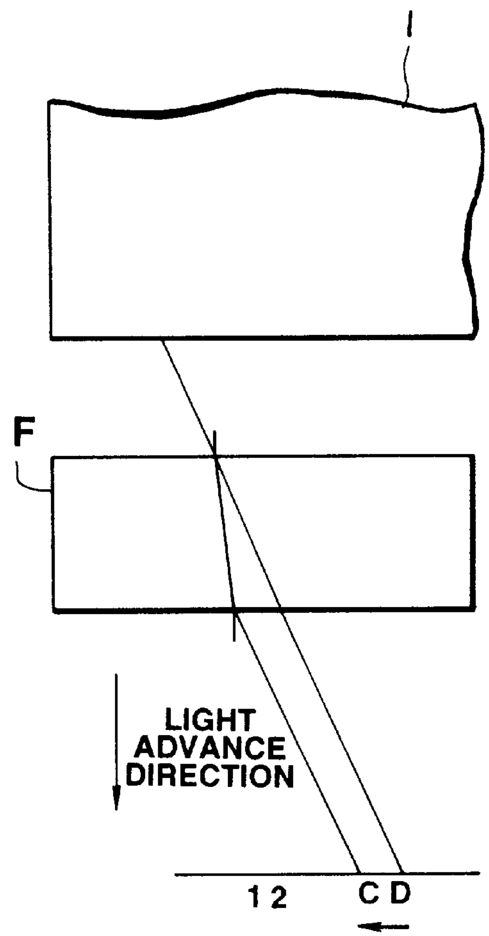

FIG. 9(*a*) shows a light path on which light emitted from an object surface 11 (corresponding to the above-described fluorescent luminous tube 4) enters a refractive index distribution type lens array through a filter F (corresponding to the above-described R, G and B color filters 7). The light path corresponds to a light path on a side of the fluorescent luminous tube 4 in each of the first to third embodiments. Light emitted from the object surface 11 is refracted through the filter F, to thereby enter a lens at a point B on an inner side as compared with a point A at which it enters the lens when the filter F is not provided.

FIG. 9(*b*) shows an optical path on which light emitted from a refractive index distribution type lens array 1 enters an image surface 12 (corresponding to the above-described color film 8) through a filter F. It corresponds to a light path on a side of the color film 8 in the optical system of each of the second and third embodiments. Light emitted from the refractive index distribution type lens array 1 is refracted through the filter F, to thereby enter an image surface at a point C on an inner side as compared with a point D at which it enters the image surface 12 when the filter F is not provided.

As will be noted from FIGS. 9(*a*) and 9(*b*), a direction of deviation of the light path by the filter F on the side of the object surface 11 is opposite to that of the light path by the filter F on the side of the image surface 12. Thus, when both deviations are rendered coincident in magnitude with each other, wave aberration due to each of the filters F can be canceled. Also, suitable adjustment of an interval between the refractive index distribution type lens array 1 and the R, G and B color filters F which is defined in a light advance direction permits wave aberration due to the refractive index distribution type lens array 1 to be canceled.

The present invention may be suitably applied to an image recording apparatus for recording an image of an electronic still camera, a video camera, a personal computer or the like on a recording medium, in addition to such a color film photographic recording apparatus having a fluorescent luminous tube incorporated as a light source therein as described above.

As can be seen from the foregoing, the photographic recording apparatus of the present invention is so constructed that the refractive index distribution type lens array is arranged in a manner to keep an axis thereof lateral with respect to a light emission direction of the luminous element. Such construction permits a thickness of the apparatus to be substantially reduced. Also, it permits the refractive index distribution type lens array used to be increased in conjugate length, resulting in an image improved in coloring and resolution being provided.

While preferred embodiments of the invention have been described with a certain degree of particularity with reference to the accompanying drawings, obvious modifications and variations are possible in light of the above teachings. It is therefore to be understood that within the scope of the appended claims, the invention may be practiced otherwise than as specifically described.

What is claimed is:

1. A photographic recording apparatus comprising:

a fluorescent luminous tube including a plurality of luminous dots prepared by a Zn based phosphor capable of emitting red to blue colors;

a refractive index distribution lens array having a conjugate distance of 400 mm or longer in proximity of said fluorescent luminous tube wherein said lens array has a central axis which intersects a light emission direction of said fluorescent luminous tube;

a first optical means provided in a light path between said fluorescent luminous tube and said refractive index distribution lens array for deflecting light emitted from said fluorescent luminous tube so that said light is parallel with a plane formed by a longitudinal extent of said fluorescent luminous tube;

a second optical means provided in a light path between said refractive index distribution optical lens array and a photosensitive recording medium wherein said light after deflection by said second optical means is perpendicular to a plane of said photosensitive recording medium whereby photographic recording apparatus is parallel to and spaced from a plane of said photographic recording medium and is positioned to permit constant speed movement of said photographic recording apparatus parallel with said photosensitive recording medium; and R, G, B color filters arranged in a light path between said fluorescent luminous tube and said photosensitive recording medium.

2. A photographic recording apparatus as defined in claim 1, wherein said R, G, B color filters are arranged between said fluorescent luminous tube and said first optical means.

3. A photographic recording apparatus as defined in claim 1, wherein said R, G, B color filters are arranged between said second optical means and said photosensitive recording medium.

4. A photographic recording apparatus as defined in claim 1, wherein said R, G, B color filters are arranged between said fluorescent luminous tube and said first optical means and between said second optical means and said photosensitive recording medium.

* * * * *

UNITED STATES PATENT AND TRADEMARK OFFICE

CERTIFICATE OF CORRECTION

PATENT NO. : 5,933,181

DATED : August 3, 1999

INVENTOR(S): Yukihiko SHIMIZU, et al.

It is certified that an error appears in the above-identified patent and that said Letters Patent is hereby corrected as shown below:

On the title page, item [30] should be:

--[30] Foreign Application Priority Data
Mar. 29, 1995 [JP] Japan .......... 7-071895--

Signed and Sealed this

Sixth Day of June, 2000

Attest:

Q. TODD DICKINSON

*Attesting Officer* *Director of Patents and Trademarks*